US009836549B2

(12) United States Patent
Heinrich et al.

(10) Patent No.: US 9,836,549 B2
(45) Date of Patent: Dec. 5, 2017

(54) COLLABORATION ADAPTER TO EXPLOIT SINGLE-USER WEB APPLICATIONS FOR COLLABORATIVE WORK

(71) Applicants: Matthias Heinrich, Dresden (DE); Franz Josef Grueneberger, Dresden (DE)

(72) Inventors: Matthias Heinrich, Dresden (DE); Franz Josef Grueneberger, Dresden (DE)

(73) Assignee: SAP SE, Walldorf (DE)

( * ) Notice: Subject to any disclaimer, the term of this patent is extended or adjusted under 35 U.S.C. 154(b) by 835 days.

(21) Appl. No.: 13/892,305

(22) Filed: May 12, 2013

(65) Prior Publication Data

US 2014/0337760 A1 Nov. 13, 2014

(51) Int. Cl.
*G06F 17/00* (2006.01)
*G06F 17/30* (2006.01)
*G06F 17/24* (2006.01)
*G06F 17/22* (2006.01)
*H04L 29/06* (2006.01)

(52) U.S. Cl.
CPC .... *G06F 17/30893* (2013.01); *G06F 17/2247* (2013.01); *G06F 17/24* (2013.01); *H04L 65/403* (2013.01)

(58) Field of Classification Search
CPC ... G06Q 10/101; H04L 65/403; G06F 3/0481; G06F 17/2247; G06F 17/241; G06F 17/24; G06F 17/30893
See application file for complete search history.

(56) References Cited

U.S. PATENT DOCUMENTS

| | | | |
|---|---|---|---|
| 5,781,732 A | 7/1998 | Adams | |
| 5,844,553 A | 12/1998 | Hao et al. | |
| 7,249,314 B2 | 7/2007 | Walker et al. | |
| 7,404,194 B2 | 7/2008 | Wason et al. | |
| 7,774,703 B2 | 8/2010 | Junuzovic et al. | |
| 7,865,606 B1 | 1/2011 | Tewes et al. | |
| 7,996,465 B2 | 8/2011 | Cromp et al. | |
| 8,078,591 B2 | 12/2011 | Rapp | |
| 8,239,760 B2 | 8/2012 | Hanson et al. | |
| 8,484,561 B1* | 7/2013 | Lemonik | G06F 17/24 715/255 |

(Continued)

OTHER PUBLICATIONS

Kiczales, G. et al.,"Aspect-Oriented Programming," © 1997, Springer-Verlag, 25 pages.*

(Continued)

*Primary Examiner* — Cesar Paula
*Assistant Examiner* — James H Blackwell (57) ABSTRACT

A framework-specific collaboration adapter (FCA) provides a lightweight transformation process capable of converting single-user Web applications into their collaborative counterparts. Thereby, a local data structure of a local document instance is transformed into a shared data structure with concurrency control support. The FCA replays local document changes at all remote sites. To mark the data model within the source code of the original application, the original single-user Web application has to be enhanced with Source Code Annotations (SCA). The concurrency control system synchronizes all shared model instances that are distributed on the client-side as well as on the server-side.

20 Claims, 8 Drawing Sheets

(56) References Cited

U.S. PATENT DOCUMENTS

| | | | |
|---|---|---|---|
| 8,499,036 B2 | 7/2013 | Kalthoff et al. | |
| 8,527,440 B2 | 9/2013 | Hettel | |
| 8,583,619 B2 | 11/2013 | Ghods et al. | |
| 8,656,271 B2 | 2/2014 | Vayssiere et al. | |
| 2009/0187834 A1* | 7/2009 | Rapo | A63F 13/10 715/758 |
| 2010/0082747 A1* | 4/2010 | Yue | G06F 17/30873 709/204 |
| 2011/0092279 A1* | 4/2011 | Pilip | A63F 13/63 3/63 |
| 2012/0233555 A1 | 9/2012 | Psistakis et al. | |
| 2013/0138733 A1* | 5/2013 | Heinrich | G06F 17/24 709/204 |
| 2013/0332813 A1 | 12/2013 | Heinrich et al. | |

OTHER PUBLICATIONS

Rohall, S. et al.,"The Zipper System for Flexible, Replicated Application Sharing," © 2005, ACM, pp. 1-10.*
Sun, D. et al.,"Operation Context and Context-based Operational Transform," © 2006, ACM, pp. 279-288.*
Heinrich, M. et al.,"Exploiting Single-User Web Applications for Shared Editing—A Generic Transformation Approach," © 11 pages.*
Zhao, C. et al.,"A Collaboration Transparence Approach to Share Heterogeneous Single-User Molecule Editors," © 2011, Elsevier Ltd., pp. 319-327.*
Adlet, A. et al.,"TellTable: A Server for Collaborative Office Applications," © XXXX, 6 pages.*
Gruneberger, F. J.,"Real-Time Collaboration Support for JavaScript Frameworks, Minor Thesis," © Jul. 14, 2012, Technische Universitat, Deresden, 119 pages.*
Lukosch, S. et al.,"Reusing Single-User Applications to Create Multi-user Internet Applications," © 2001, Springer-Verlag Berlin Heidelberg, pp. 79-90.*
Sun, C. et al.,"Transparent Adaptation of Single-User Applications for Multi-User Real-Time Collaboration," © 2006, ACM, pp. 531-582.*
Sanderson, S.,"Introducing Knockout, a UI Library for JavaScript," © Jul. 5, 2010, 10 pages.*
Xia, S. et al.,"Leveraging Single-user Applications for Multi-user Collaboration: the CoWord Approach," © 2004, ACM, pp. 162-171.*
Yue, C. et al.,"RCB: A Simple and Practical Framework for Real-time Collaborative Browsing," © 2009, 40 pages.*
Isenhour, P.L. et al.,"Supporting Interactive Collaboration on the Web with CORK," © 2001, Interacting with Computers 13, pp. 655-676.*
Vidot, N. et al.,"Copies Convergence in a Distributed Real-Time Collaborative Environment," © 2000, ACM, pp. 171-180.*
Li, D. et al, "A Lightweight Approach to Transparent Sharing of Familiar Single-User Editors," © 2006, ACM, pp. 139-148.*
Pichiliani, M.C. et al.,"A Guide to Map Application Components to Support Multi-User Real-Time Collaboration," © 2006, IEEE, 5 pages.*
Pichiliani, M.C. et al.,"A Technical Comparison of the Existing Approaches to Support Collaboration in Non-Collaborative Appliations," © 2009, IEEE, pp. 314-321.*
Heinrich, M.,"Enriching Web Applications Efficiently with Real-Time Collaboration Capabilities," Doctoral Dissertation in Web Engineering and Web Science vol. 1, Tecnische Univeritat Chemnitz, 2014, 209 total pages.*
Manno, I. et al.,"Introducing COllaboration in Single-user Applications though the Centralized Control Architecture," © 2010, IEEE, 10 pages.*
Atwood, Jeff,"Understanding Model-View-Controller," © May 5, 2008, Coding Horror blog, 23 pages.*
Ellis, C.A. et al.,"Concurrency Control in Groupware Systems," © 1989, ACM, pp. 399-407.*
Pastor, Pablo,"MVC for Noobs," © Mar. 24, 2010, blog posting, 9 pages.*
Lin, K. et al.,"Leveraging Single-User Microsoft Visio for Multi-user Real-Time Collaboration," © 2007, Springer-Verlag, pp. 353-360.*
Lin, K. et al.,"API Design Recommendations for Facilitating Conversion of Single-user Applications into Collaborative Applications," © 2007, IEEE, 9 pages.*
Liu, A.F. et al.,"CoMaya: Incorporating Advanced Collaboration Capabilities into 3D Digital Media Design Tools," © 2008, ACM, pp. 5-8.*
Streitz, N.A. et al.,"DOLPHIN: Integrated Meeting Support across LiveBoards, Local and Remote Desktop Environments," © 1994, ACM, pp. 1-14.*
Krasner, G.E. et al.,"A Cookbook for Using the Model-View-Controller User Interface Paradigm in Smalltalk-80," © 1988, JOOP, pp. 26-49.*

* cited by examiner

FIGURE 1

```
// @CLASS("TASK")
VAR TASK = FUNCTION (DATA) { THIS.NAME = KO.OBSERVABLE(DATA.NAME) }

TASK.PROTOTYPE.DELETE = FUNCTION() { MODEL.TASK.REMOVE(THIS) }

// @SYNC("MODEL")
VAR MODEL = { INPUT: KO.OBSERVABLE(),
              TASK: KO.OBSERVABLEARRAY() }

MODEL.ADDTASK = FUNCTION() {
    MODEL.TASKS.PUSH(NEW TASK({ 'NAME': MODEL.INPUT()}));
    MODEL.INPUT("") }

KO.APPLYBINDINGS(MODEL);
...
```

COLLABORATION ADAPTER TO EXPLOIT SINGLE-USER WEB APPLICATIONS FOR COLLABORATIVE WORK

FIELD

The field generally relates to the software arts, and, more specifically, to methods and systems including a collaboration adapter to exploit single-user Web applications for collaborative work.

BACKGROUND

Nowadays, collaborative Web applications are widespread since they exhibit numerous advantages in contrast to traditional desktop applications. Leveraging the Web as an application platform provides users with access from different devices (e.g., PCs, smartphones, etc.) and allows immediate adoption without requiring time-consuming installation procedures. Moreover, real-time collaborative Web applications such as Google Docs allow multiple users to edit the same document simultaneously replacing conventional document merging or document locking techniques.

Existing collaborative applications support a variety of shared editing use cases ranging from jointly authoring text documents, spreadsheets, and presentations to collaboratively creating source code files or Business Process Model and Notation (BPMN) models. Shared editing applications have to incorporate concurrency control capabilities to enable users shared access. That allows synchronizing numerous document instances in real-time and enables potential editing conflicts to be resolved automatically (e.g., if two users change the same word or graphic). However, specific concurrency control services are not included in general-purpose frameworks such as jQuery® or Knockout®. Hence, developers have to get familiar with specific collaboration frameworks (e.g., ShareJS®). Further, even the collaborative Web applications are appealing to end-users, the implementation is a complicated and a time-consuming task due to the insufficient development support.

The extra concurrency control library requires additional programming tasks that may substantially increase the development costs. First, Web developers have to get familiar with an extra programming library. Second, synchronizing multiple document instances requires capturing and replaying all document changes that may involve plenty of source code changes. Third, introducing a number of scattered source code changes contradicts the separation-of-concerns principle and eventually increases maintenance effort.

SUMMARY

Various embodiments of systems and methods including a collaboration adapter to exploit single-user Web applications for collaborative work are described herein. In various embodiments, the method includes receiving a notification at a framework-specific adapter that a first local model of a first Web application of a first client is modified, wherein the first local model was enhanced with annotations during design time of the first Web application. Then, the modification of the first local model is converted into an operational transformation operation. The method also includes applying the operational transformation operation on a first shared model of a concurrency control system. In addition, a textual representation of the operational transformation operation is transmitted to a second client including a second Web application, wherein a second local model of the second Web application was enhanced with the annotations. Finally, the first local model and the second local model are synchronized with the modification.

In various embodiments, the system includes a processor and a memory in communication with the processor. According to one aspect, the memory includes a first Web application located on a first client including a first local model, wherein the first local model was enhanced with annotations during design time of the first Web application. The system also includes a framework-specific collaboration adapter that parses the first local model and registers a set of listeners to inform when a modification in the first local model occurs. A concurrency control system includes a first shared model. Further, an operational transformation handler is included that converts the modification in the first local model into an operational transformation operation and applies the operational transformation operation to the first shared model. Finally, a serializer is included that converts the operational transformation operation into a textual representation that is transmitted to a second client to apply the modification on a second shared model and a second local model of a second Web application, wherein the second local model of the second Web application was enhanced with the annotations.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for methods and systems including a collaboration adapter to exploit single-user Web applications for collaborative work are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

For a significant part of Web applications, such as Model-View-Controller (MVC) applications, programming efforts can be simplified since the MVC applications expose an isolated data model that may be synchronized automatically using an intelligent collaboration adapter. Due to the fact that numerous widespread Web frameworks (e.g., SAPUI5, Knockout, Backbone.js, etc.) enforce applications to be structured according to the established MVC pattern, the approach of automatically synchronizing data model instances could be adopted by plenty of Web applications. In various embodiments, systems and methods include a collaboration adapter that provides a lightweight transformation process capable of converting single-user MVC applications into their collaborative counterparts. Thereby, a local data structure may be transformed into a shared data structure with concurrency control support.

Figure 1:
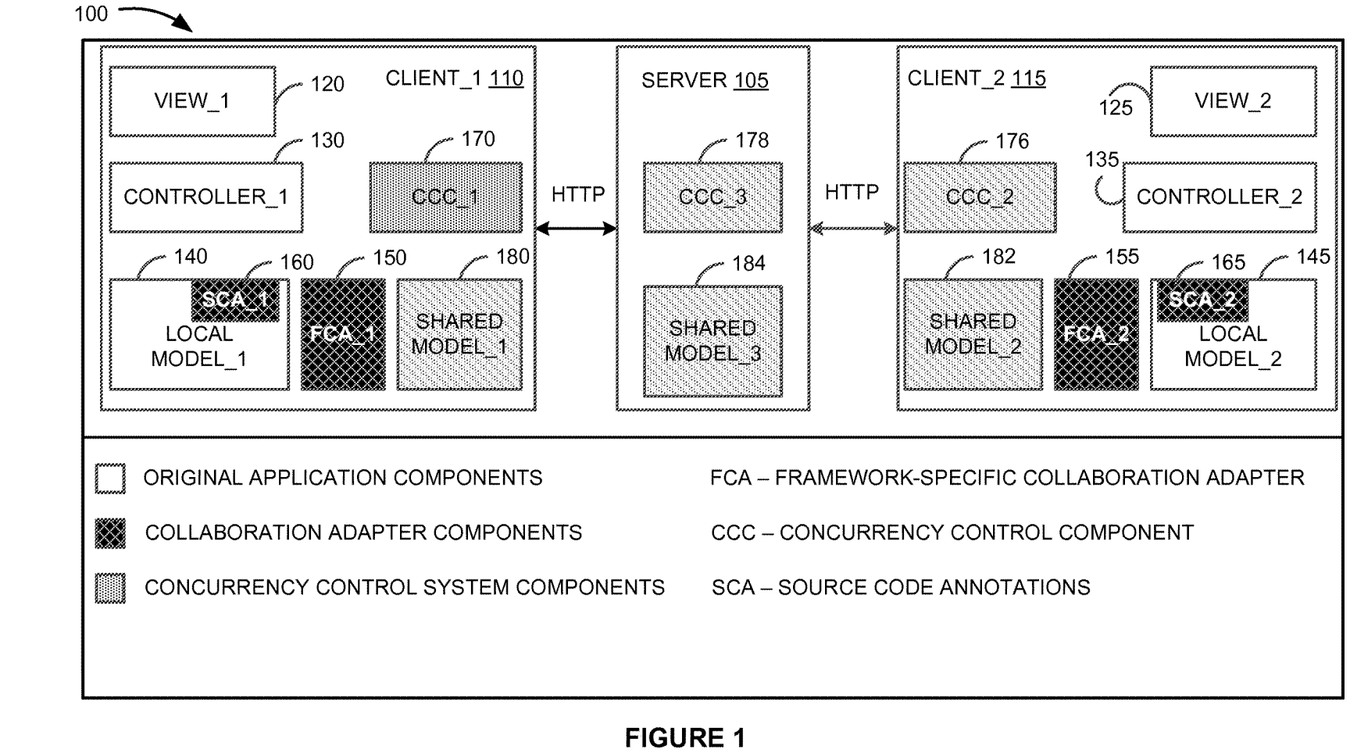
FIG. 1 is a block diagram illustrating an architectural view of a collaboration system including a collaboration adapter, according to an embodiment.

FIG. 1 is a block diagram illustrating an architectural view of a collaboration system including a collaboration adapter, according to an embodiment. In various embodiments, collaboration system 100 includes a server 105 and a set of clients such as client_1 110 and client_2 115. The components of collaboration system 100 are divided into several different types of components including, but not limited to: framework-based original application components, collaboration adapter components, and concurrency control system components. The framework-based original application components, such as MVC application components, include a view (e.g., view_1 120 and view_2 125), a controller (e.g., controller_1 130 and controller_2 135), and a local model (e.g., local model_1 140 and local model_2 145). The framework-based original application components represent components of an application developed on a given Web framework, such as Knockout, and located on the client side. In the MVC pattern, the controller acts as a mediator between the view and the local model. This means that once the user triggers some changes in the view component, they are propagated to the local model and vice versa.

The concurrency control system components are located on both client and server side. These components include a Concurrency Control Component (CCC), such as CCC_1 170, CCC_2 176, and CCC_3 178, and a shared model, such as shared model_1 180, shared model_2 182, and shared model_3 184. A concurrency control system, such as SAP Gravity, is a distributed system that provides synchronization of data models such as various document instances of a text document. For example, a document can be opened online for editing by multiple users at the same time for changing some texts, adding pictures to the documents and so on. The concurrency control system synchronizes the different document instances opened for edit by the different users using shared data models. In addition, the concurrency control system resolves any editing conflicts that may occur during the synchronization process.

The collaboration adapter components are located on the client side and include Framework-specific Collaboration Adapters (FCAs), such as FCA_1 150 and FCA_2 155, and Source Code Annotations (SCAs), such as SCA_1 160 and SCA_2 165. In various embodiments, the FCA is developed for a particular Web framework. For example, for the Knockout Web framework, there is a specific FCA; for the SAPUI5 Web framework, there is another FCA, and so on. This means that it is not necessary to implement an FCA for each Web application, but to implement an FCA for each and every Web framework that is supported by the client side.

In various embodiments, the collaboration adapter captures local model manipulations and replays remote model modifications. The collaboration adapter provides collaboration functionality such as concurrency control services. The captured model changes have to be supplied to the collaboration engine to react upon model changes. Hence, model manipulations can be recorded and propagated. The capture and replay logic is accommodated in the Framework-specific Collaboration Adapter (FCA). In various embodiments, the FCA is the main component providing the local-to-shared model conversion. Further, the FCA is in charge for bridging the gap between a local data model and a shared data model. For example, between local model_1 140 and shared model_1 180. Thus, the FCA records, filters and propagates local document changes. Moreover, the FCA replays local document changes at all remote sites. This functionality is performed by enriching the original application with Source Code Annotations (SCAs).

Annotations represent a viable means to declaratively mark a data model in order to configure the collaboration adapter. The data model structure determines the quantity of required annotations. Applications with subgraph-based data structures require solely one annotation since the interlinked data structure can be completely discovered by marking the single root node of the data model. Minimizing the number of SCAs is essential for increasing developer productivity. The FCA includes an annotation processor that replaces the Source Code Annotations (SCAs) with JavaScript® (hereinafter, "JavaScript") function calls once the application is loaded. These inserted function calls are a means to register listeners as well as to attach replay handlers.

To support proper document synchronization and conflict resolution, an Operational Transformation Engine (OTE) may be included at both client side and server side to handle all sync mechanics. Thereby, the FCA supplies change notifications that are converted by the OTE into operational transformation (OT) operations. Transforming concurrent OT operations, allows to resolve conflicts and to maintain consistent document copies. For example, if two users simultaneously add a character at the first position of their document copy, the OTE adapts the indexes so that one character is added at the first position while the other character is inserted at the second position. Hence, the editing conflict is resolved and both document copies are consistent.

Another responsibility of the OTE is to serialize OT operations in a JSON representation. Serialized OT operations are sent to a central server using common bi-directional, HTTP-based communication techniques such as long polling, Hypertext Transfer Protocol (HTTP) streaming, WebSockets®, and so on. The server instance forwards the messages to all clients except the sender client. Once the message is delivered to a client, the JSON message is deserialized into an OT operation. In order to reconcile potential conflicts, this OT operation has to be transformed against concurrent local operations. Transformed OT operations are translated into model manipulations to sync the respective model instance.

Figure 2:
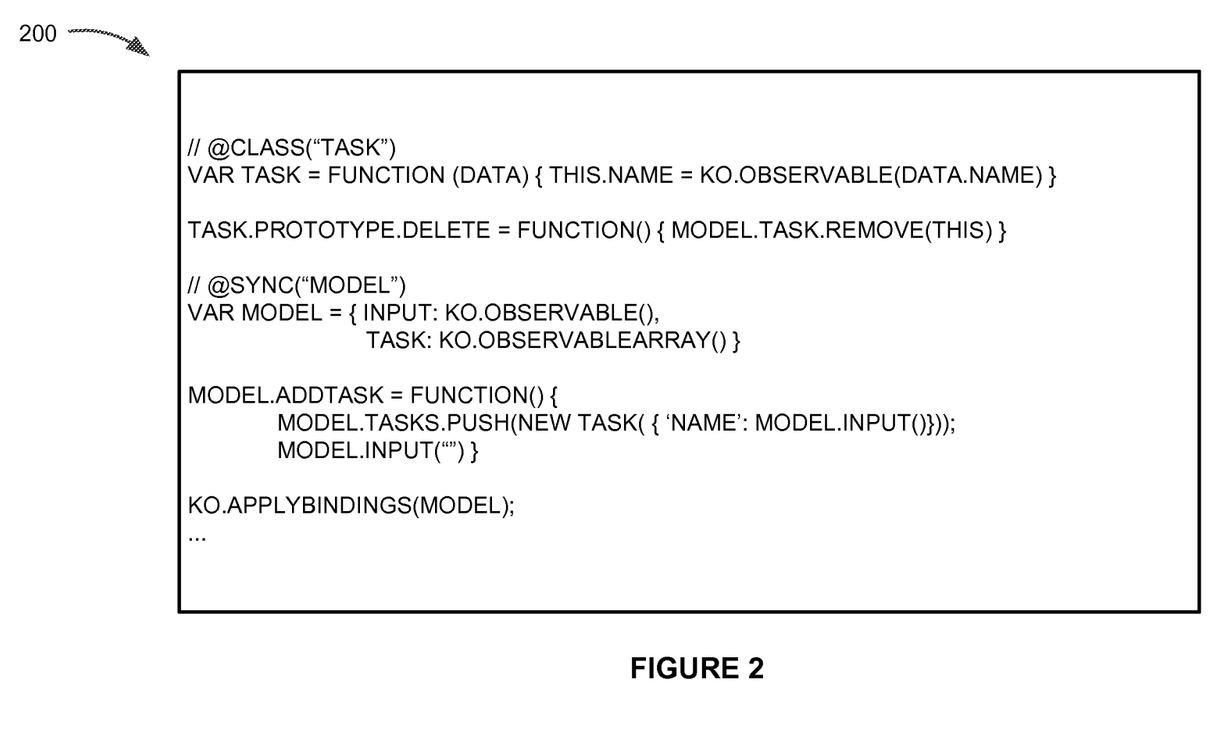
FIG. 2 is a diagram illustrating an example of an annotated data model, according to an embodiment.

FIG. 2 is a diagram illustrating an example of an annotated data model, according to an embodiment. Example 200 illustrates an annotated data model of a Web application developed on the Knockout Web framework. However, it should be noted that annotations may be used to enhance data models of Web applications developed on different Web frameworks. In various embodiments, the transformation of a single-user MVC Web application to a collaborative MVC Web application may include the following steps: 1) annotate the application's source code to mark up the data model; and 2) import a JavaScript file that encapsulates the logic of the collaboration adapter into the original single-user Web application. In example 200, the data model is annotated using minimal annotation language including the following source code annotations: 1) @Sync(modelName); and 2) @Class(className). All annotations are encapsulated in JavaScript comments since JavaScript does not offer a native annotation concept.

The @Sync(modelName) annotation marks the data model (e.g., the Knockout data model) that should be synchronized among all application instances sharing the same session. The parameter "modelName" identifies the name of the JavaScript variable pointing to the data model. In 200, the JavaScript variable is named "model". The @Class(className) annotation marks the object constructor to allow creating new task objects. In some embodiments, an object constructor may be used to allow for a proper replay of a local object creation at all remote sites, since the object creation might involve some side effects. For example, creating a new object might entail to increment a global counter. This side effect of incrementing a counter may not be replayed in a generic fashion and thus, the collaboration adapter requires a handle to the actual object constructor.

In various embodiments, besides inserting source code annotations in files encapsulating data model definitions, another step is importing the JavaScript file into the original single-user Web application during design time. A specific JavaScript file (for example, an fca.js file) has to be embedded into the header section of the single-user application's main HyperText Markup Language (HTML) file. For example, the following source code may be inserted into the header section: "<script type="text/javascript" src="fca.js"/>.

Figure 3:
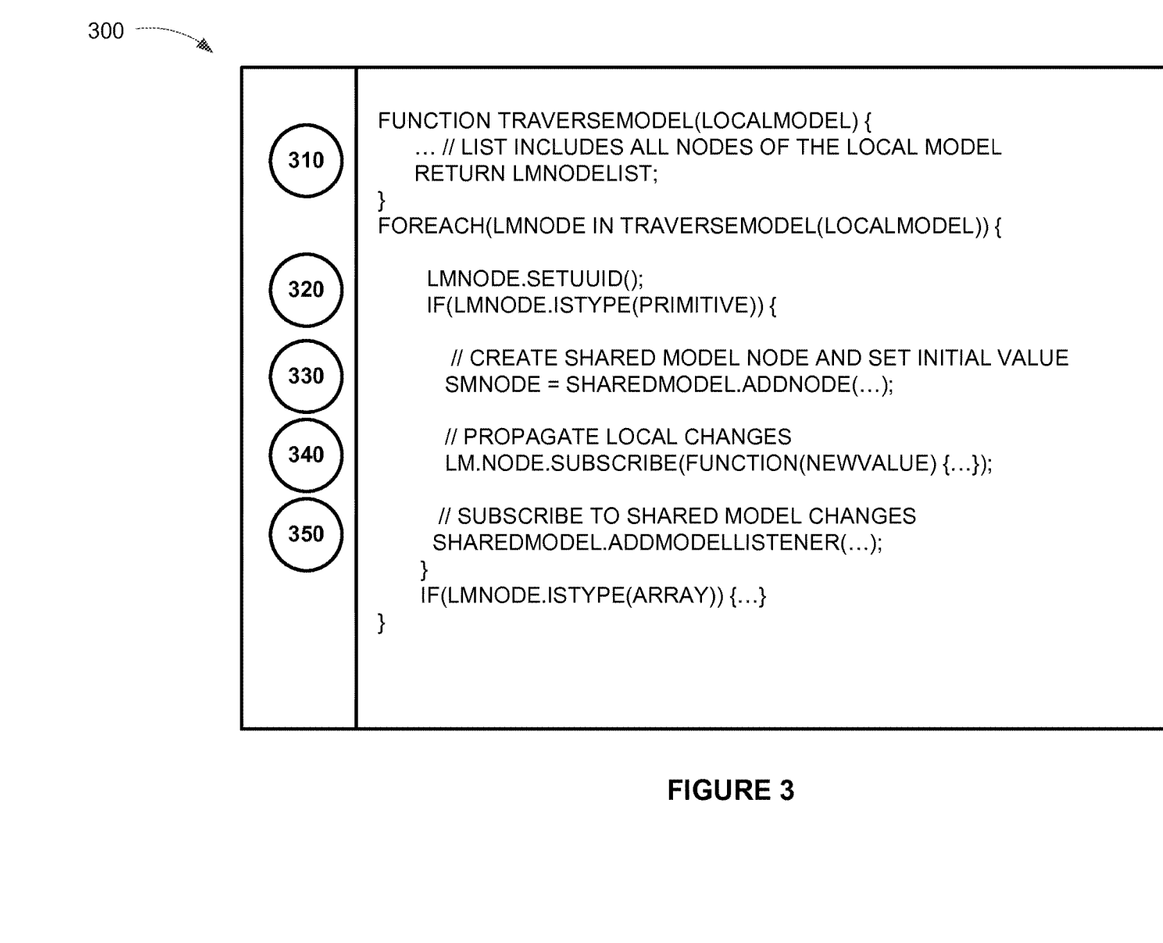
FIG. 3 is a diagram illustrating a function replacing the @Sync annotation, according to an embodiment.

FIG. 3 is a diagram illustrating a function replacing the @Sync annotation, according to an embodiment. In various embodiments, one of the FCA components is the annotation processor. The annotation processor replaces the @Class annotation and the @Sync annotation with JavaScript source code at runtime. The annotation processing starts with parsing all model definition files and then identifies the inserted annotations. These annotations are expanded to blocks of JavaScript code, which for the @Class annotation is straightforward. The logic replacing the @Class annotation expands to a function call storing a reference to the constructor method in a global map and thus, new objects can easily be created. For the replacement of the @Sync annotation, the inserted code has to bridge the gap between the local model and the shared model of the concurrency control system. This may essentially enable the propagation of local manipulations and the replay of remote manipulations.

FIG. 3 depicts an exemplary skeleton 300 of the function replacing the @Sync annotation. It should be noted that this skeleton is implemented in accordance with SAP Gravity® concurrency control system. Other concurrency control systems may also be used. A graph model is created using a dedicated JavaScript Application Programming Interface (API) that offers functions such as createModel( ), addNode( ), etc. The concurrency control system may synchronize all shared data model instances automatically. Hence, to sync an application, the local model has to be mapped to the concurrency control system's shared data structure and vice versa. This bi-directional mapping may be implemented by several functions included in skeleton 300.

Function 310 represents traversing the local model, for example local model_1 140. The local data model may be identified using the @Sync annotation. In some embodiments, the local data model may represent a tree structure of data objects. Therefore, the entire tree structure should be traversed. Function 320 represents assigning a unique identifier (ID) to the local model nodes. In this way, the changed nodes of the local data model may be recognized and identified. Function 330 represents creating concurrency control system counterparts for the local model nodes in the shared model. For example, if there is a local model tree structure with four nodes (data objects), then four data objects have to be created in the shared model instance as well. Function 340 represents registering a set of listeners on the local model nodes at runtime to inform the collaboration adapter about local changes. For example, if a user has opened a document online and starts editing the document, the document provider should be aware of any changes that may be performed on the document. This is possible by registering listeners.

Function 350 represents attaching the set of listeners to the local model (e.g., local model_1 140) and also to the concurrency control system nodes (shared model_1 180) to replay remote changes. Initially, when a user makes a change in the local data model, a listener fires an event about the local change. Then, the collaboration adapter captures the change, extracts the required information, and distributes the change to all clients. Thus, initially, the change is reflected in the local data model and then in the shared model of the current client (e.g., local model_1 140 and shared model_1 180 in client_1 110), but the change is not distributed to the local data models of the other clients yet (e.g., local model_2 145 of client_2 115). That is why, it is necessary to attach listeners to the shared model of the concurrency control system as well, so that the other clients are informed about the change. Subscriptions on the shared model of the current client (e.g., client_1 110) are necessary to keep track of the remote modifications issued by the remote client(s) (e.g., client_2 115) and vice versa. Then, the change is replayed at the local models of the other clients. In comparison to inserting a one-line annotation, the complex functionality, supporting arbitrary local models, adds up to more than a thousand lines of JavaScript code. This complexity originates from the generic applicability of the function that supports the traversal of all graph-structured local models, the mapping of various local node types, the callback registration for different model change operations, etc.

It should be noted that inserting the source code annotations is performed at design time, while the functions presented in skeleton 300 are performed during runtime. The JavaScript file embedded into the header section of the single-user application's main HTML file (e.g., the fca.js file) of the collaboration adapter contains the parser and replacement logic that is executed at runtime. Once the application is loaded in a Web browser, the collaboration adapter functionality is performed. The annotations inserted at design time are replaced with JavaScript blocks. The collaboration adapter tries to map the local data model to the shared data model. Therefore, a set of listeners are registered in the local model and in the shared model of the concurrency control system to capture changes of user actions in the application. These changes are then propagated to the shared data model. The shared data model located on the client running the application is synchronized with the shared data model on the server side. On each client, there are at least two data models: a local data model of the Web application and an instance of the shared data model of the concurrency control system. These two data models have to be mapped accordingly for the application to be synchronized.

Figure 4:
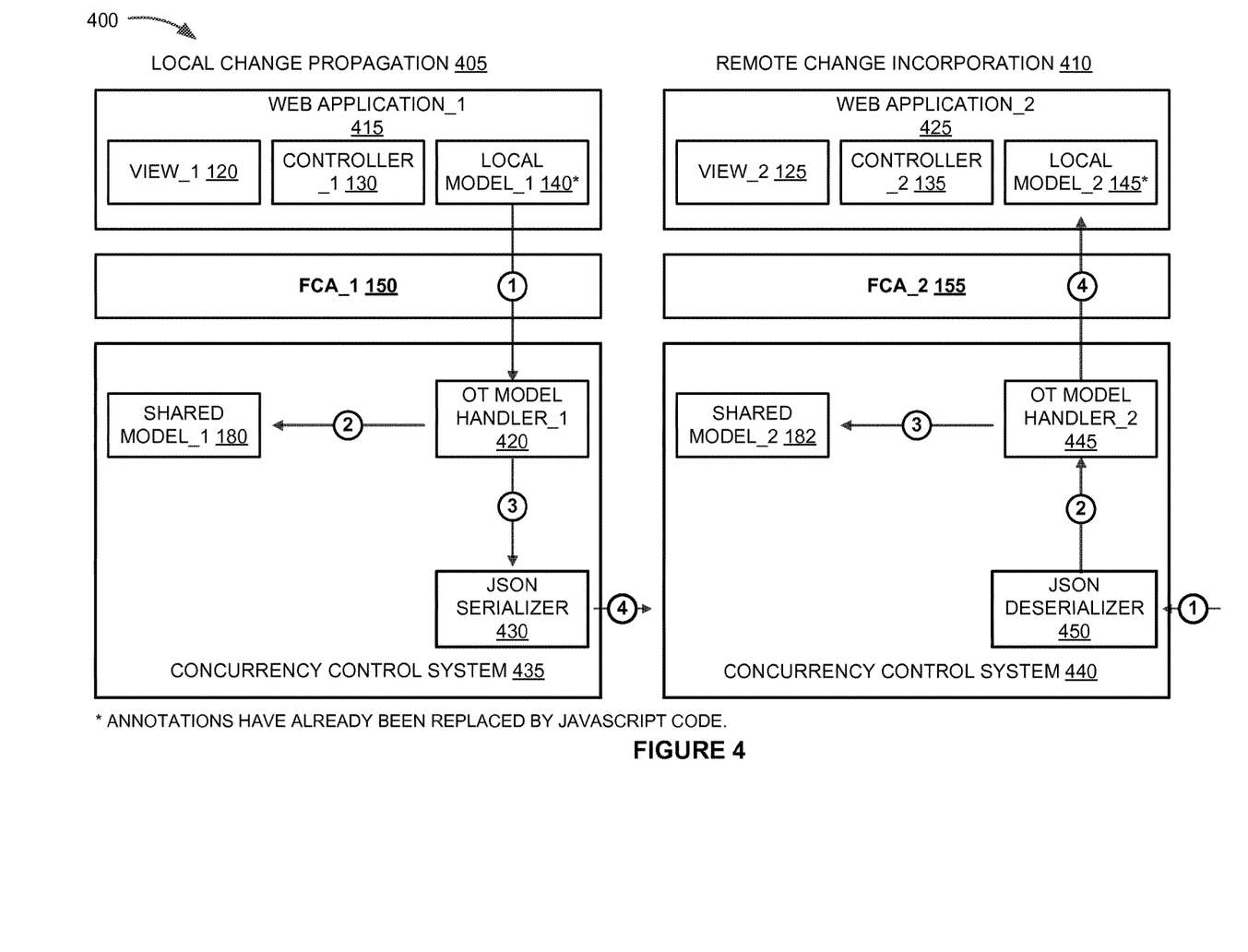
FIG. 4 is a block diagram illustrating a synchronization workflow of the collaboration adapter, according to an embodiment.

FIG. 4 is a block diagram illustrating a synchronization workflow of the collaboration adapter, according to an embodiment. In various embodiments, after all annotations were replaced with corresponding JavaScript functions, the synchronization workflows are executed by the browser's JavaScript engine. The synchronization 400 is divided into two processes: local change propagation 405 and remote change incorporation 410. In various embodiments, the local change propagation 405 workflow starts with a user change in the user interface (e.g., view_1 120) of a Web application_1 415. The controller_1 130 reflects the change in the local model_1 140 of the Web application. As described above, when loading the Web application, the FCA_1 150 registers a set of listeners on the local model_1 140 that listen for any manipulations modifying the local model. When a modification occurs, the FCA_1 150 extracts the required information. The required information includes the IDs of the local model nodes affected by the modification, the type of the modification (e.g., change, create, or delete operations), any new values (e.g., if a text node was changed from "hello" to "hello world"). The listeners translate all types of manipulations into concurrency control system API calls. Further, the listeners of the FCA_1 150 inform the operational transformation (OT) model handler_1 420 of the concurrency control system (CCS) 435 about the modification in the local model_1 140 via the API calls.

As soon as the OT model handler_1 420 is notified about the occurred modifications, the OT model handler_1 420 translates the local model modifications into operational transformation (OT) operations. Operational transformation is the predominant algorithm that synchronizes shared document instances and resolves conflicts. Then, the OT model handler_1 420 applies the OT operations on the shared model_1 180. The local change propagation 405 workflow then continues at the JSON serializer 430. JSON (JavaScript Object Notation) is a lightweight data-interchange format that is completely language independent and is used for parsing and transmitting data structures over a network. Serialization is the process of translating data structures or object state into a format that can be stored. The JSON serializer 430 converts the OT operations into a JSON representation (e.g., text format) that is transmitted to the server (e.g., server 105). The server distributes the JSON messages to all clients (e.g., client_2 115) except the sender client (e.g., client_1 110).

In various embodiments, clients receiving JSON messages (e.g., text stream) trigger the remote change incorporation 410 process. Initially, the JSON deserializer 450 of CCS 440 transforms received JSON messages from the JSON serializer 430 into JavaScript objects that include OT operations. The OT model handler_2 445 then transforms these OT operations against concurrent local OT operations to resolve potential editing conflicts. The resulting transformed OT operations are then applied to the shared model_2 182. Using the annotations and the IDs of the local model nodes, the OT model handler_2 445 knows where synchronization in the local model_2 145 is needed. Finally, the OT model handler_2 445 reflects the modifications in the local model_2 145 and thus, synchronizes both local models, local model_1 140 and local model_2 145.

Figure 5:
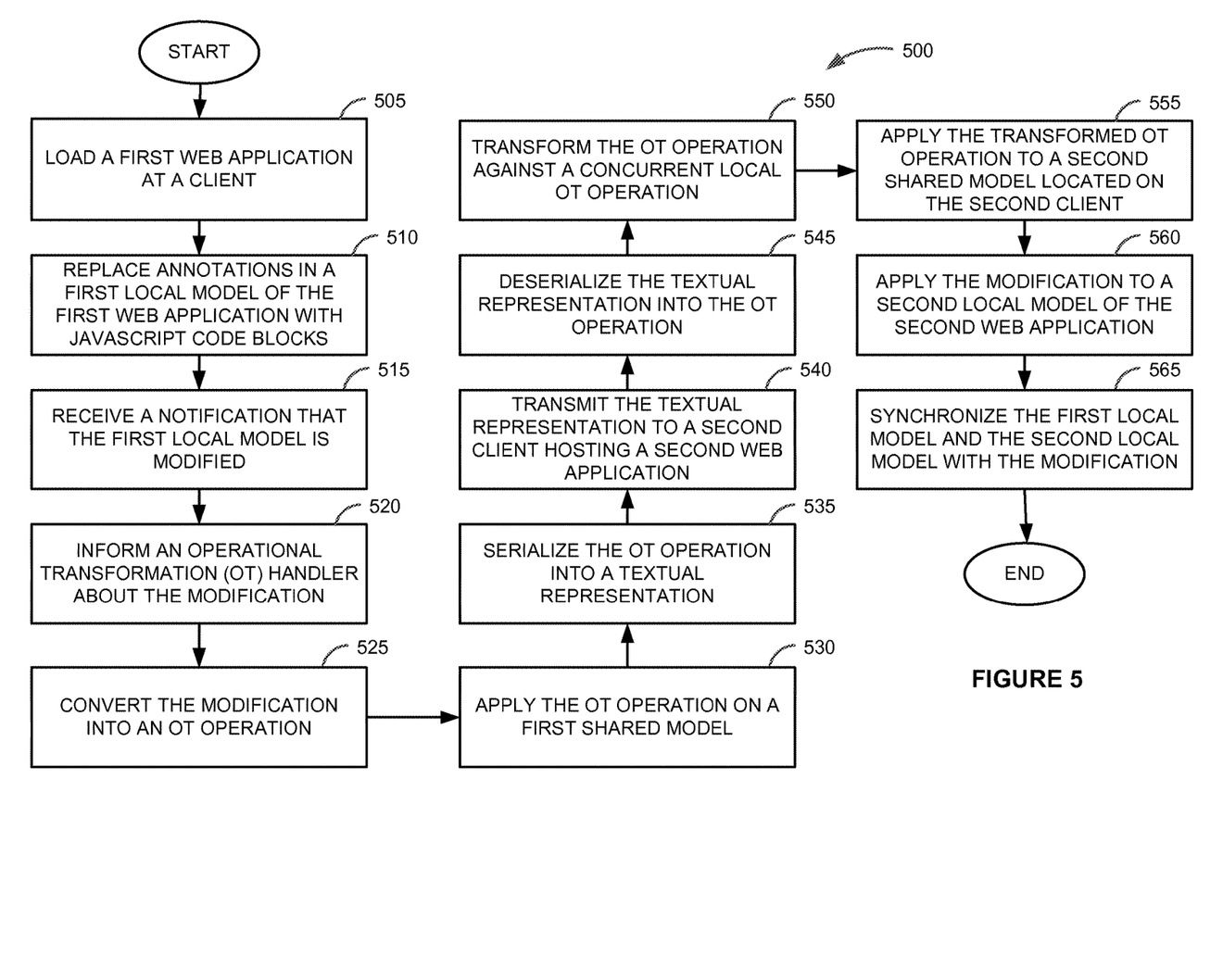
FIG. 5 is a flow diagram illustrating exploiting single-user Web applications for collaborative work, according to an embodiment.

FIG. 5 is a flow diagram illustrating exploiting single-user Web applications for collaborative work, according to an embodiment. Process 500 begins at block 505 with loading a first single-user Web application at a client. Before a client retrieves a Web application from a server, the annotations are inserted. Thus, all clients retrieving the Web application receive an annotated Web application. Then, all clients replace the annotations once the Web application is loaded. At block 510, the annotations in a first local model of the first Web application and the annotations in a second local model of a second Web application are replaced with JavaScript code blocks. In various embodiments, the annotations were inserted during design time.

Besides the annotations, a JavaScript file was embedded into the header section of the single-user Web application's main HTML file (e.g., the fca.js file). After loading the Web application, the JavaScript file is executed by framework-specific collaboration adapter. The framework-specific collaboration adapter performs parsing all model definition files and then identifies the inserted annotations. These annotations are expanded to blocks of JavaScript code. This means that the annotations are replaced with JavaScript functions by an annotation processor that is encapsulated in the JavaScript file. Further, the above functions of skeleton 300 are implemented, including, but not limited to: 1) traversing the first local model; 2) assigning IDs to the first local model nodes; 3) creating CCS counterparts for the first local model nodes; 4) registering a set of listeners on the first local model nodes; and 5) attaching the set of listeners to a first shared model nodes to replay remote changes. It should be noted that the JavaScript file is executed on all clients loading the Web application and the above functions of skeleton 300 are implemented on all the clients loading the Web application as well including, but not limited to, client_1 110 and client_2 115.

At block 515, a notification is received that the first local model is modified. The notification is received by the set of listeners registered on the first local model nodes. In various embodiments, the notification is received at the framework-specific collaboration adapter. The set of listeners translate the modification in the first local model into a CCS API call. The modification may be a change operation, a create operation, a delete operation, and so on. At block 520, an operational transformation (OT) handler is informed about the modification in the first local model via the CCS API call. At block 525, the modification is translated into an OT operation. Then, the OT operation is applied on a first shared model of a concurrency control system (CCS), at block 530. The OT handler forwards the OT operation to a JSON serializer. At block 535, the OT operation is serialized into a textual representation. Then, the textual representation is transmitted to a second client hosting a second Web application, at block 540. It should be noted that the first Web application and the second Web application are Web application instances opened on different clients of a Web application located on a server such as server 105. For example, a document for online editing is located on a server and an instance of the document is opened for edit on one client and a second instance of the same document is opened for edit on a second client. Thus, the textual representation is first transmitted to the server. The server then transmits the textual representation to all clients, such as the second client, except the sender client, i.e. the first client.

At block 545, the textual representation is deserialized back to the OT operation. Then, the OT operation is transformed against a concurrent local OT operation to resolve potential editing conflicts. This is performed at block 550. At block 555, the transformed OT operation is applied to a second shared model located on the second client. At block 560, the modification of the first local model is retrieved and applied to a second local model of the second Web application. At block 565, the first local model and the second local model are synchronized.

Figure 6:
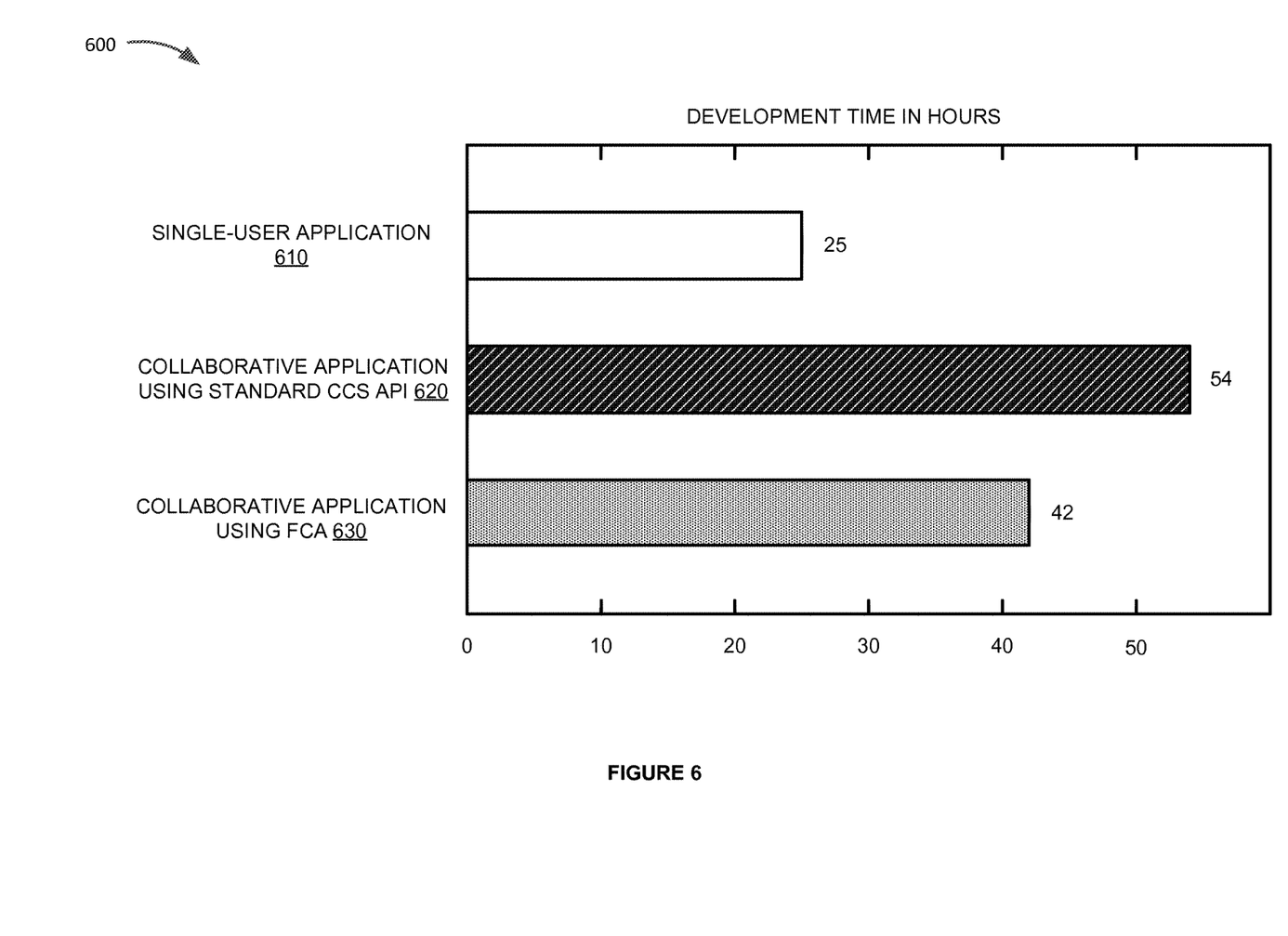
FIG. 6 is a diagram illustrating evaluation results based on development time needed for developing a Web application.

FIG. 6 is a diagram illustrating evaluation results based on development time needed for developing a Web application. Evaluation 600 represents a developer study, where a number of computer science students were selected to develop a single-user Web application and one collaborative Web application using two different technologies. It should be noted that the students were familiar with numerous programming languages (e.g., Java®, C®, etc.), but the students had no knowledge regarding the development of shared editing applications. The time needed for the students to develop the applications was measured in hours. Evaluation 600 includes the development time needed for developing a single-user application 610, a collaborative application using a standard CCS API 620 (for example, SAP Gravity API), and a collaborative application using a framework-specific collaboration adapter 630 (such as FCA_1 150).

On average, the development time of a single-user application 610 took 25 hours. Further, students spent 54 hours to get familiar with a standard CCS API, such as the SAP Gravity API, and to program the collaborative Web application 620. In contrast, the students needed 42 hours to adopt source code annotations and to develop a collaborative application using an FCA 630. Hence, employing the annotations-based approach may reduce the development time and effort by 22 percent. The overall development time of 54 hours and 42 hours respectively include 25 hours that were dedicated to the implementation of the single-user application 610. Thus, the actual development effort for introducing shared editing capabilities adds up to 29 hours for development 620 versus 17 hours for development 630. This represents a 41 percent reduction when adopting the annotation-based approach. Evaluation 600 clearly shows that the annotation-based approach of the FCA is beneficial in terms of efficiency and can significantly outperform conventional collaboration libraries.

Figure 7:
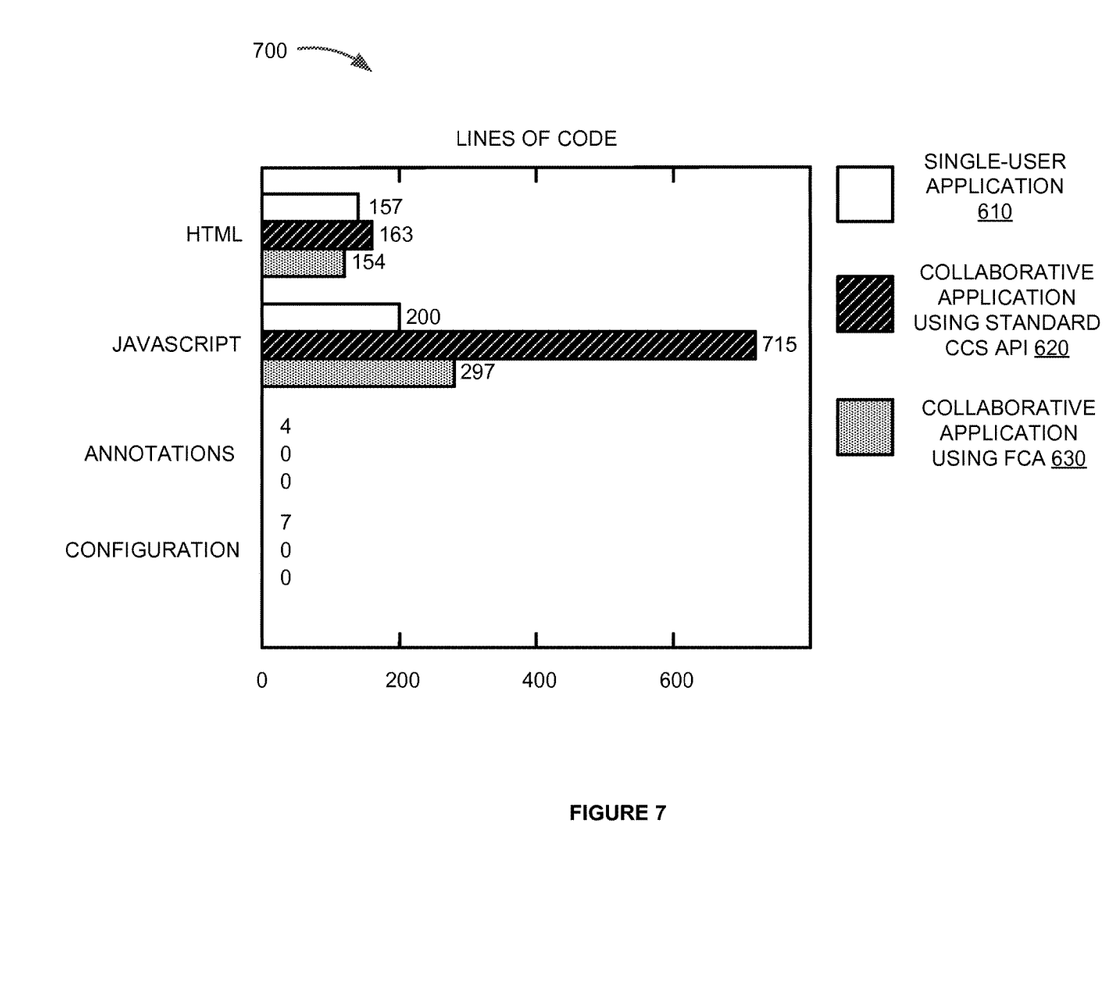
FIG. 7 is a diagram representing evaluation results based on lines of code needed for developing a Web application.

FIG. 7 is a diagram representing evaluation results based on lines of code needed for developing a Web application. Evaluation 700 represents a developer study which results were taken from the same test performed for evaluation 600. Evaluation 700 measures the lines of code (LoC) written when developing a single-user application 610, a collaborative application using a standard CCS API 620 (for example, SAP Gravity API), and a collaborative application using a framework-specific collaboration adapter 630 (such as FCA_1 150). The code contributions were divided into the following individual categories: (1) HTML code; (2) JavaScript code; (3) annotation code; and (4) configuration code. Evaluation 600 shows the LoC measurements, where in each category the total number is depicted.

One distinguishing factor between the use of the standard CCS API (e.g., SAP Gravity API) and the use of annotations is the JavaScript LoC measure. On average, developers needed 97 lines of JavaScript code accompanied by 4 annotations and 7 configuration lines to inject collaboration capabilities in contrast to 515 lines of JavaScript code for adopting the Gravity API. This represents a considerable reduction of 81 percent in terms of JavaScript code when using the annotation-based approach of the FCA. Even though the HTML LoC exposes only minor differences, the overall LoC measure resulting in 878 LoC versus 462 LoC once again shows a 47 percent source code reduction adopting the annotation-based approach. The substantial LoC reduction is another demonstration of the efficiency an annotation-based solution can deliver.

Traditionally, converting a single-user Web application into a collaborative one requires a concurrency control library, such as SAP Gravity or Apache Wave, necessitating a plenty of source code changes. The framework-specific collaboration adapter may substantially reduce the development effort in terms of development time and added source code lines. Evaluation 600 and evaluation 700 demonstrate reduced development time by more than 40 percent and reduced number of added source code lines by almost 50 percent. Further, the collaboration adapter is framework-specific. This means that one framework-specific collaboration adapter may serve hundreds or even thousands of Web applications.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
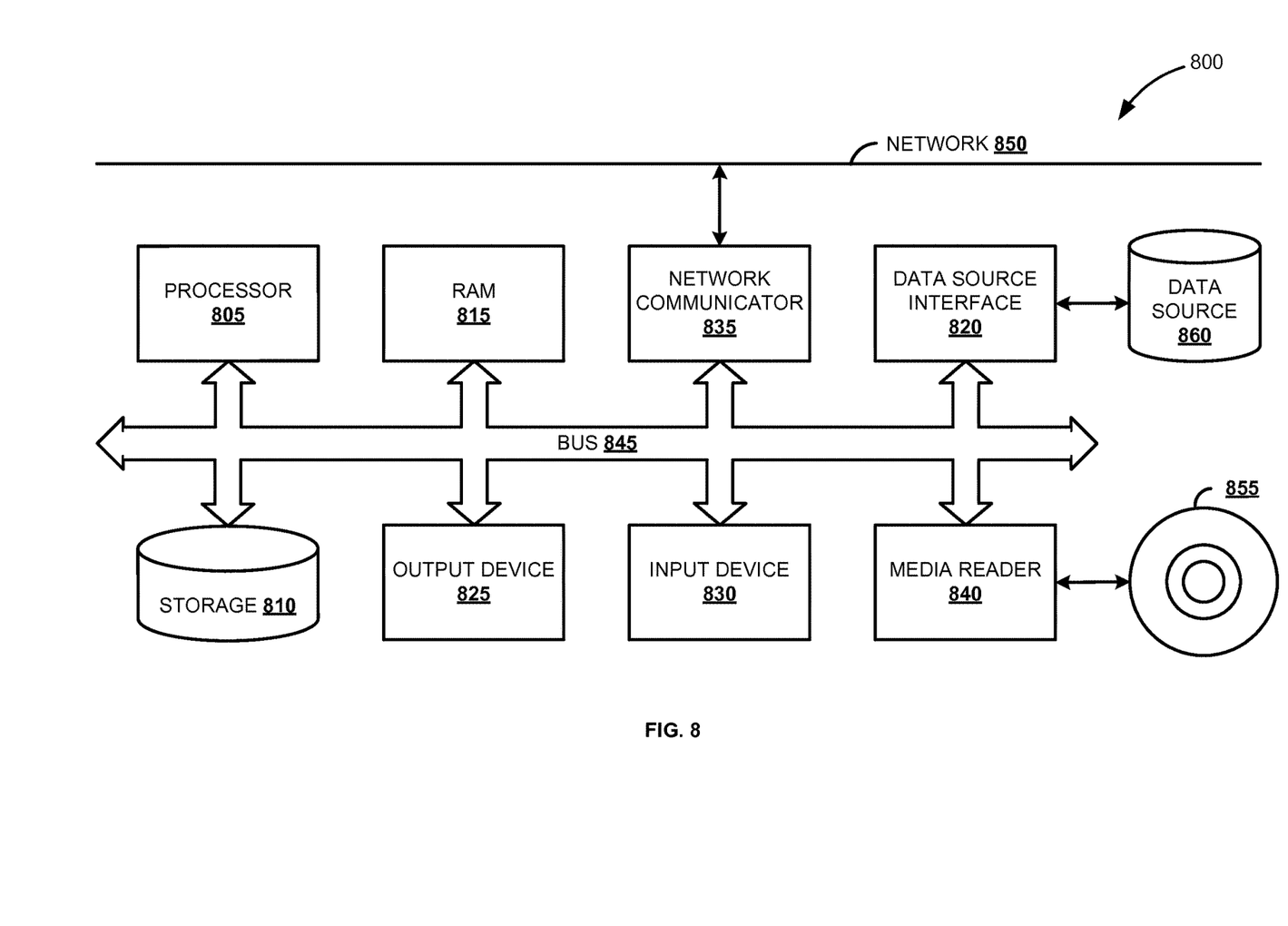
FIG. 8 is a block diagram of an exemplary computer system 800, according to an embodiment.

FIG. 8 is a block diagram of an exemplary computer system 800, according to an embodiment. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for exploiting a single-user MVC Web application for collaborative work, the method comprising:
   receiving a modification of a first Model-View-Controller (MVC) local model of a first instance of the single-user Web application of a first client, wherein the first MVC local model is an isolated data model enhanced with source code annotations marking the first MVC local model for synchronization among instances of the single-user Web application, and wherein the first instance of the single-user Web application is structured according to a MVC pattern;
   converting the received modification of the first MVC local model into an operational transformation operation;
   applying the operational transformation operation on a first MVC shared model of a concurrency control system on the first client, wherein the first shared model is created with collaborative counterparts of the first MVC local model nodes, and wherein the first shared model is mapped to the first MVC local model via a bi-directional mapping;
   transmitting by a processor over a network a textual representation of the operational transformation operation to a second client including a second instance of the Web application, wherein a second MVC local model of the second instance of the Web application is enhanced with the source code annotations, and wherein the second instance of the Web application is structured according to the MVC pattern;
   automatically synchronizing a second MVC shared model of the concurrency control system with the first MVC shared model to distribute the modification of the first MVC local model, wherein the second MVC shared model is located on the second client; and
   upon the synchronization of the second shared model of the concurrency control system with the modification, synchronizing the second MVC local model with the second shared model of the concurrency control system to distribute the modification of the first MVC local model to the second MVC local model.

2. The method of claim 1, wherein synchronizing the second MVC local model comprising:
   deserializing the textual representation back to the operational transformation operation;
   transforming the operational transformation operation against a concurrent local operational transformation operation;

applying the transformed operational transformation operation to the second MVC shared model located on the second client; and applying the modification of the second MVC shared model to the second local model.

3. The method of claim 1, wherein the first MVC local model and the second MVC local model are enhanced by embedding a JavaScript file into the first instance of the Web application and the second instance of the Web application, wherein the JavaScript file is executed when the first instance of the Web application and the second instance of the Web application are loaded.

4. The method of claim 3, wherein the source code annotations are replaced with JavaScript functions by an annotation processor that is encapsulated in the JavaScript file.

5. The method of claim 4, wherein the JavaScript functions comprise:

traversing the first MVC local model and the second MVC local model;

assigning a first set of unique identifiers to the first MVC local model nodes and a second set of unique identifiers to second MVC local model nodes; and creating a first set of first shared model counterparts for the first MVC local model nodes and a second set of second shared model counterparts for the second MVC local model nodes.

6. The method of claim 5, further comprising:

registering a set of listeners to the first MVC local model nodes to inform about modifications in the first MVC local model; and attaching the set of listeners to first MVC shared model nodes to replay remote modifications.

7. The method of claim 1, further comprising: translating the modification into a concurrency control system message sent from a listener of a framework-specific adapter to an operational transformation handler of the concurrency control system to inform about the modification.

8. A computer system, comprising:

a processor;

a memory in communication with processor, the memory comprising:

a first instance of a Web application located on a first client including a first MVC local model, wherein the first MVC local model is enhanced with source code annotations marking the first MVC local model for synchronization among instances of the Web application, and wherein the first instance of the Web application is structured according to a MVC pattern;

a framework-specific collaboration adapter that parses the first MVC local model and registers a set of listeners to inform when a modification in the first MVC local model occurs;

a concurrency control system that includes a first MVC shared model created with collaborative counterparts of the first MVC local model nodes, and wherein the first shared model is mapped to the first MVC local model via a bi-directional mapping;

an operational transformation handler that converts the modification of the first MVC local model into an operational transformation operation and applies the operational transformation operation to the first MVC shared model; and a serializer that converts the operational transformation operation into a textual representation that is transmitted to a second client to apply the modification on a second MVC shared model and a second MVC local model of a second instance of the Web application, wherein the second MVC local model of the second instance of the Web application is enhanced with the source code annotations, and wherein the second Web application is structured according to the MVC pattern.

9. The computer system of claim 8, further comprising:

a deserializer that deserializes the textual representation back to the operational transformation operation;

a second concurrency control system that includes the second MVC shared model; and a second operational transformation handler at the second client that transforms the operational transformation operation against a concurrent local operational transformation operation.

10. The system of claim 9, wherein the second operational transformation handler applies the transformed operational transformation operation to the second MVC shared model.

11. The system of claim 8, wherein the framework-specific collaboration adapter comprises an annotation processor that replaces the source code annotations with JavaScript code blocks at runtime.

12. The system of claim 8, wherein the set of listeners are attached to first MVC shared model nodes to replay remote modifications.

13. The system of claim 11, wherein the JavaScript code blocks comprise:

a first block for traversing the first MVC local model and the second MVC local model;

a second block for assigning a first set of unique identifiers to the first MVC local model nodes and a second set of unique identifiers to second MVC local model nodes; and a third block for creating a set of first shared model counterparts for the first MVC local model nodes and a second set of second shared model counterparts for the second MVC local model nodes.

14. A non-transitory computer-readable medium storing instructions, which when executed cause a computer system to:

receive a modification of a first Model-View-Controller (MVC) local model of a first instance of a Web application of a first client, wherein the first MVC local model is an isolated data model enhanced with source code annotations marking the first MVC local model for synchronization among instances of the Web application, and wherein the first Web application is structured according to a MVC pattern;

convert the received modification of the first MVC local model into an operational transformation operation;

apply the operational transformation operation on a first MVC shared model of a concurrency control system on the first client, wherein the first shared model is created with collaborative counterparts of the first MVC local model nodes, and wherein the first shared model is mapped to the first MVC local model via a bi-directional mapping;

transmit by a processor over a network a textual representation of the operational transformation operation to a second client including a second instance of the Web application, wherein a second MVC local model of the second instance of the Web application is enhanced with the source code annotations, and wherein the second instance of the Web application is structured according to the MVC pattern;

automatically synchronize a second MVC shared model of the concurrency control system with the first MVC shared model to distribute the modification of the first MVC local model, wherein the second MVC shared model is located on the second client; and upon the synchronization of the second shared model of the concurrency control system with the modification, synchronize the second MVC local model with the second shared model of the concurrency control system to distribute the modification of the first MVC local model to the second MVC local model.

15. The computer-readable medium of claim 14, wherein synchronize the second MVC local model comprises instructions that cause the computer system to:

deserialize the textual representation back to the operational transformation operation;

transform the operational transformation operation against a concurrent local operational transformation operation;

apply the transformed operational transformation operation to the second MVC shared model located on the second client; and apply the modification of the second MVC shared model to the second local model.

16. The computer-readable medium of claim 14, wherein the first MVC local model and the second MVC local model are enhanced by embedding a JavaScript file into the first instance of the Web application and the second instance of the Web application, wherein the JavaScript file is executed when the first instance of the Web application and the second instance of the Web application are loaded.

17. The computer-readable medium of claim 16, wherein the source code annotations are replaced with JavaScript functions by an annotation processor that is encapsulated in the JavaScript file.

18. The computer-readable medium of claim 17, wherein the JavaScript functions comprise instructions that cause the computer system to:

traverse the first MVC local model and the second MVC local model;

assign a first set of unique identifiers to the first MVC local model nodes and a second set of unique identifiers to second MVC local model nodes; and create a first set of first shared model counterparts for the first MVC local model nodes and a second set of second shared model counterparts for the second MVC local model nodes.

19. The computer-readable medium of claim 18, further comprising instructions to cause the computer system to:

register a set of listeners to the first MVC local model nodes to inform about modifications in the first MVC local model; and attach the set of listeners to first MVC shared model nodes to replay remote modifications.

20. The computer-readable medium of claim 14, further comprising instructions to cause the computer system to translating the modification into a concurrency control system message sent from a listener of a framework-specific adapter to an operational transformation handler of the concurrency control system to inform about the modification.

* * * * *